Sept. 20, 1927.
J. IMSCHWEILER
CHICKEN FOUNTAIN
Filed May 24, 1926
1,642,926
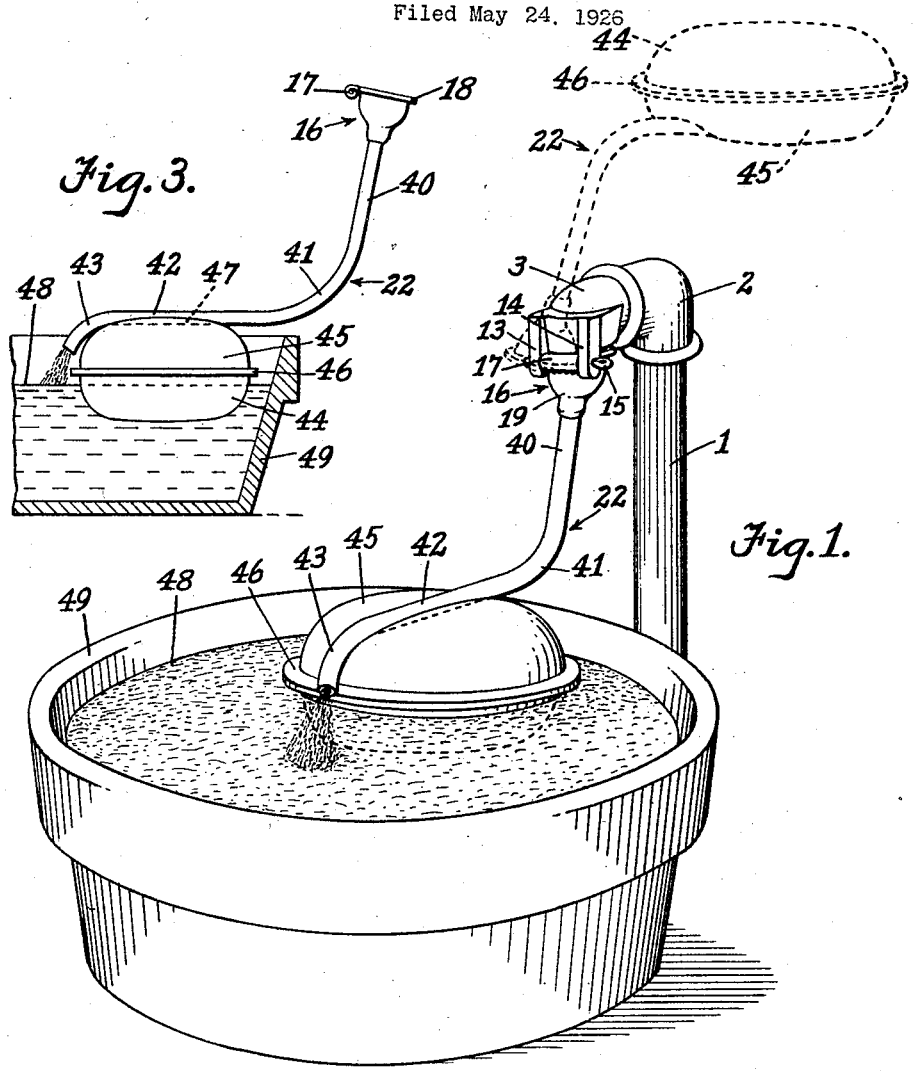
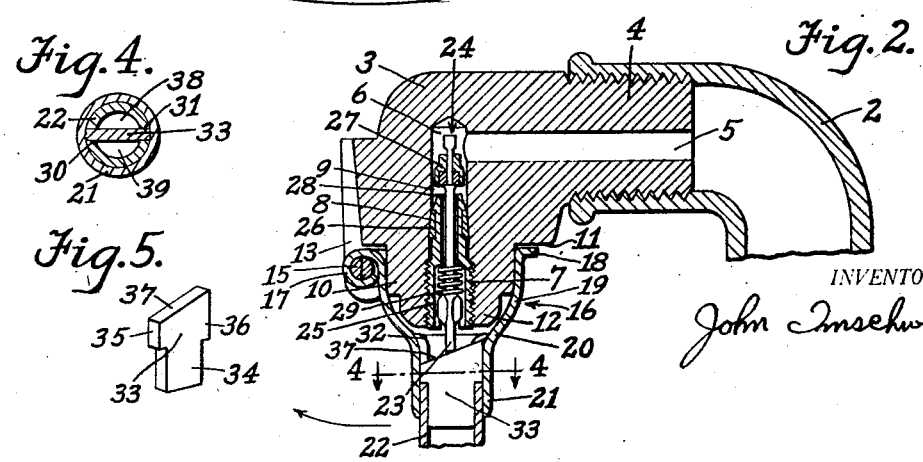
INVENTOR,
John Imschweiler Patented Sept. 20, 1927.

1,642,926

UNITED STATES PATENT OFFICE.

JOHN IMSCHWEILER, OF INGLEWOOD, CALIFORNIA.

CHICKEN FOUNTAIN.

Application filed May 24, 1926. Serial No. 111,428.

My invention relates to poultry yard appliances, and consists of the novel features herein shown, described and claimed.

An object is to make a chicken fountain having a conduit for carrying from a source of supply to a poultry drinking receptacle.

Another object is to make a chicken fountain having a conduit extending over a float and downwardly so that the running water may readily be seen and will not splash.

Another object is to make a chicken fountain having a self closing valve operated by a float so that when the float goes down the valve is opened and the water allowed to run and when the float goes up the valve closes and the water stops running and having a conduit for carrying the water to a drinking receptacle.

Another object is to make a float controlled chicken fountain in which water is carried from a standpipe head to a drinking receptacle through a conduit, so that the drinking receptacle may be out of vertical alignment with the connection of the standpipe head with the receiving end of the conduit.

Another object is to make a chicken fountain having a conduit forming a close connection with a standpipe head so as to receive water from standpipe head without splashing the water and so as to conduct the water to a fountain drinking receptacle, the conduit serving as an arm and there being a float on the swinging end of the conduit and adapted to rest upon the water in the drinking receptacle.

My invention consists of a standpipe head, a self closing valve in the standpipe head, a conduit pivotally connected to the standpipe head and adapted to fit the head, so as to hold the water from spattering, a valve opener in the conduit and a float connected to the conduit.

Fig. 1 is a perspective of a chicken fountain embodying the principles of my invention.

Fig. 2 is an enlarged fragmentary vertical central section of the standpipe head and associated parts.

Fig. 3 is a reduced fragmentary section and elevation showing the drinking receptacle out of vertical alignment with the conduit head.

Fig. 4 is a cross section on the line 4—4 of Fig. 2 and looking downwardly.

Fig. 5 is a perspective of the valve opener.

The standpipe 1 is attached to a water supply pipe not shown and is intended to be supplied constantly with the water under some pressure. An elbow 2 is fixed upon the upper end of the standpipe 1.

The standpipe head 3 is a casting and has a nipple 4 screwed firmly into the elbow 2, and the nipple 4 has a bore 5 leading from its inner end into the head 3 and communicating with the valve chamber 6.

When considered with the nipple 4 the standpipe head 3 is elbow shaped in side elevation with the discharge end pointing downwardly. The nipple 4 is preferably one quarter inch pipe size.

The valve chamber 6 is formed from the lower end of the standpipe head 3 and has an enlarged screw threaded portion 7, a reduced packing seat 8 extending upwardly from the portion 7 and a still further reduced portion 9 extending upwardly from the seat 8 to the bore 5 so that the bore 5 and the chamber 6 form a water passage leading from the elbow 2 and discharging downwardly.

The lower portion of the head 3 has a circular slightly tapered or rounded head 10 extending downwardly from a seat 11, an extension portion 12 extending downwardly from the head 10 and having a rounded and lower face, and the valve chamber 6 is formed from the extreme lower face of the portion 12.

Ears 13 and 14 extend forwardly from the head 10 and a pivot pin 15, preferably a cotter, is mounted in the ears 13 and 14.

The conduit head 16 is preferably stamped from flat sheet metal and has a bearing 17 rolled and fitting between the ears 13 and 14 and upon the pin 15 and has a rim 18 adapted to fit against the seat 11 and has a circular portion 19 loosely around the head 10 and a tapered portion 20 loosely around the extension 12 and has a ferrule or sleeve 21 extending downwardly.

The main portion of the conduit is preferably a tube 22.

It is to be understood that the conduit may be of any form that will produce a trough or channel to positively carry water laterally.

The operating stem 23 of the self-closing valve 27 of the valve construction 24 extends downwardly below the lower face of the extension 12.

The head 25 of the valve construction 24 is screw seated in the portion 7 of the valve chamber 6, the valve packing 26 fits in the seat 8 and the stem 23 moves the valve proper 27 away from its seat 28 and a spring 29 serves to move the valve 27 against the seat 28.

The conduit 22 as shown is a tube and has notches 30 and 31 formed from its upper end and diametrically opposed, and the tube is pressed tightly into the sleeve 21, and the upper end of the tube is expanded into the lower part of the tapered portion 20, so as to make a rounded inner corner 32 to avoid the tendency to catch water and cause it to rebound.

Considering the elbow 2 as pointing forwardly the pin 15 is in front and the notches 30 and 31 are respectively at the front and back.

The valve opener 33 is a flat piece of metal formed with a punch and die and has a straight shank 34 projections 35 and 36 extending outwardly above the shank and an inclined working face 37 upon its upper end.

The valve opener 33 is placed in position by inserting it downwardly through the head 16 until the shank 34 is pushed tightly into the upper end of the tube 22 and the projections 35 and 36 are pressed into the notches 30 and 31.

The working face 37 is in position to engage the lower end of the operating stem 23 so that when the conduit head 16 swings upon the pin 15 the self-closing valve 27 is opened or allowed to close.

The valve opener 33 is comparatively thin and leaves openings 38 and 39 at its side to allow water to pass freely downwardly.

The conduit 22 has a portion 40 extending downwardly from the head 16, a portion 41 curved downwardly and forwardly from the portion 40, a portion 42 extending forwardly from the portion 41, and a portion 43 extending forwardly and downwardly from the portion 42.

The float consists of the lower portion 44 and the upper portion 45.

The float is pressed from sheet metal and the two portions are reversed relative to each other and secured together by interlocking portions forming a rim 46.

The upper portion 45 has a groove 47 pressed downwardly diametrically across its top and the portion 42 of the conduit is substantially half embedded in the groove and securely soldered.

The portion 43 of the conduit forms the discharge end and is slightly above the normal level 48 of the drinking water in the crock 49 so that the flow of water may readily be seen, and so that the flowing water discharges in a collected or non-spattering or unobstructed condition directly into the drinking water in the crock 49.

The crock 49 may be of ordinary stoneware or it may be any suitable form of pan or receptacle for poultry to drink from.

As shown in Figs. 1 and 3, the crock 49 may be some distance in front of the conduit head 16 and need not be in vertical alignment with the head 16, because the water is conducted forwardly by the conduit and does not fall directly downwardly.

When desired the float may be swung upwardly and backwardly, as shown in dotted lines in Fig. 1, and will rest in this position indefinitely while the self-closing valve construction 24 is being removed and a new valve inserted or while the crock 49 is being emptied and cleaned and for other purposes.

While I have shown and described what I now consider the best construction it is to be understood that various changes may be made without departing from the spirit of my invention as claimed.

I claim:

1. A chicken fountain having a standpipe head a self-closing valve controlling the passage through the head, a movable conduit connected to the head and adapted to catch the water when the valve is open, a valve opener in the conduit, and a float for operating the conduit so as to open the valve.

2. A chicken fountain comprising a standpipe head adapted to be attached to a standpipe and to discharge the water downwardly and having a self-closing valve, a movable conduit leading downwardly and laterally from said head, a float for raising and lowering the conduit, and a valve opener in the conduit adapted to open the valve when the conduit is lowered by the float.

3. A chicken fountain having a standpipe head, a self-closing valve controlling the passage through the head, a movable conduit connected to the head and adapted to catch the water when the valve is open, a valve opener in the conduit, and a float for operating the conduit so as to open the valve, the conduit passing over the float and discharging beyond the float.

4. A chicken fountain having a vertically movable valve and a float controlled valve operating conduit.

5. A fountain comprising a valve controlled water outlet; a hingedly supported conduit in communication with the water outlet; a float connected with the conduit and means movable with the conduit for operating the valve of the water outlet.

6. A fountain comprising a float; a valve controlled water outlet; a conduit movable with the float and arranged to operate the valve, said conduit having its one end in communication with the water outlet and its other end disposed to discharge over and beyond the float.

In testimony whereof I have signed my name to this specification.

JOHN IMSCHWEILER.